(12) United States Patent
Smith

(10) Patent No.: US 6,269,432 B1
(45) Date of Patent: Jul. 31, 2001

(54) DISTRIBUTED TRANSACTIONAL PROCESSING SYSTEM HAVING REDUNDANT DATA

(75) Inventor: Robert Smith, Wylie, TX (US)

(73) Assignee: Ericsson, Inc., Research Triangle Park, NC (US)

(*) Notice: Subject to any disclaimer, the term of this patent is extended or adjusted under 35 U.S.C. 154(b) by 0 days.

(21) Appl. No.: 09/178,456

(22) Filed: Oct. 23, 1998

(51) Int. Cl.[7] .................................................. G06F 12/00
(52) U.S. Cl. ............................ 711/162; 711/141; 707/204
(58) Field of Search ................................. 711/161, 162; 707/200, 201, 202, 204; 714/1, 2, 5, 6, 42, 100

(56) References Cited

U.S. PATENT DOCUMENTS

| | | | |
|---|---|---|---|
| 5,197,148 | * 3/1993 | Blount et al. | 395/575 |
| 5,295,258 | * 3/1994 | Jewett et al. | 395/575 |
| 6,052,797 | * 4/2000 | Ofek et al. | 714/6 |
| 6,073,251 | * 6/2000 | Jewett et al. | 714/7 |

* cited by examiner

Primary Examiner—Kevin Verbrugge
(74) Attorney, Agent, or Firm—Jenkens & Gilchrist, P.C.

(57) ABSTRACT

A system and method for replicating data in a distributed transactional processing system having redundant cache memories and disk memories. The data replicating method includes updating a primary cache, followed by updating the secondary cache. Next, the primary disk memory is updated, followed by the secondary disk memory being updated. Based upon the success of each update, a determination is made as to whether the data replication is successful. In a number of instances, the data replication operation is determined to have been successfully executed despite the failure of one or more memory updates. The resulting database is highly available to the rest of the system.

20 Claims, 3 Drawing Sheets

DISTRIBUTED TRANSACTIONAL PROCESSING SYSTEM HAVING REDUNDANT DATA

BACKGROUND OF THE INVENTION

1. Technical Field of the Invention

The present invention relates to a distributed transactional processing system, and in particular to a system and method of replicating data in a distributed database.

2. Background and Objects of the Invention

Today, many computing systems, such as distributed transactional processing systems, utilize cache memory in order to increase processing speeds. A cache may typically comprise random access memory (RAM) and a register which points to a location in the RAM where previously stored data resides. Cache memory may be a fraction of the size of main memory. By keeping the most frequently accessed data in the cache, memory access time approaches the access time of the cache.

High performance transactional processing systems typically possess relatively high data transaction rates and data availability characteristics. These required system characteristics have led to the architecture of system databases to both employ cache memory to achieve the high data transaction rates as well as use redundant memory devices to better ensure that data is substantially and consistently accessible to the rest of the system. For example, prior systems have employed a pair of cache memories designated as a primary cache and a secondary cache. Prior systems additionally employed a pair of disk memories designated as a primary disk memory and a secondary disk memory.

One problem associated with systems employing redundant memory devices concerns data replication, i.e., maintaining consistency throughout the memory database during system operation. Prior transactional processing systems included various synchronous protocols to replicate data between the memory devices. One such synchronous protocol, a two phase commit procedure, often causes the database and system to hang in the event access to a memory device fails. As a result, there exists a need for an improved data replication procedure for use in a transactional processing system.

It is an object of the present invention to provide a method for replicating data in a distributed transactional processing system.

It is another object of the present invention to provide such a method which better maintains database availability despite memory device failure.

SUMMARY OF THE INVENTION

The present invention overcomes the shortcomings in existing transactional processing systems and satisfies a significant need for a system and method for replicating data while maintaining high availability and performance levels.

According to a preferred embodiment of the present invention, there is provided a system and method for a distributed transactional processing system. The system includes a distributed database which provides an interface to a number of clients. The distributed database includes two memory nodes. Each memory node includes a cache memory and a memory disk. One cache memory is designated the primary cache and the other the secondary cache. Similarly, one memory disk is designated the primary disk and the other is designated the secondary disk. Each cache and disk preferably has a cache manager process and disk manager process associated therewith, respectively. The caches, cache managers, disks and disk managers are configured to perform, among other tasks, data replication within the database.

When a client associated with the database presents a transaction thereto, such as a request to update the database with a data object, the system attempts to first update the primary cache with the data object, followed by attempting to update the secondary cache. Next, an attempt is made to update the primary disk with the data object. The system then attempts to update the secondary disk with the data object. A process associated with the client monitors the success of each attempt to update the memory devices, and generates a response thereto.

In the event that the primary cache was the only memory device successfully updated, the requested transaction has failed. The client is notified of the failure. In addition, since the primary cache was successfully updated with the data object, the updated data object is deleted therefrom. The next time the data object is accessed from the database, the data object is taken from the primary disk and copied into the primary cache. In the event the data object is not successfully deleted from the primary cache, then the primary cache is marked as being out of sync and the secondary cache is designated as the primary cache. Later, attempts may be undertaken to automatically re-sync the primary cache.

In the event that only the primary cache and just one of the disks were successfully updated with the data object, then the transaction is deemed to be successfully completed. The client is notified of a successful commit. The secondary cache and the disk which failed to be updated are both marked as being out of sync.

In the event that only the secondary cache is unsuccessfully updated, then the transaction is deemed to have been successfully completed. The client is notified of the successful commit. The secondary cache is marked as being out of sync.

In the event the both the primary and the secondary disks are unsuccessfully updated, then the transaction is deemed to have been unsuccessfully completed. The client is notified of the unsuccessful commit. The data object is deleted from the primary and secondary caches. If the data object is unsuccessfully deleted from either of the caches, then the corresponding cache is marked as being out of sync.

In the event that only one of the disks was unsuccessfully updated with the data object, then the transaction is deemed to have been successfully performed. The client is notified of the successful commit. The disk which was unsuccessfully updated is marked as being out of sync.

If the data object was successfully loaded into each of the caches and disks, then the client is notified of the successfully completed transaction.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE PREFERRED EXEMPLARY EMBODIMENTS

The present invention will now be described more fully hereinafter with reference to the accompanying drawings in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
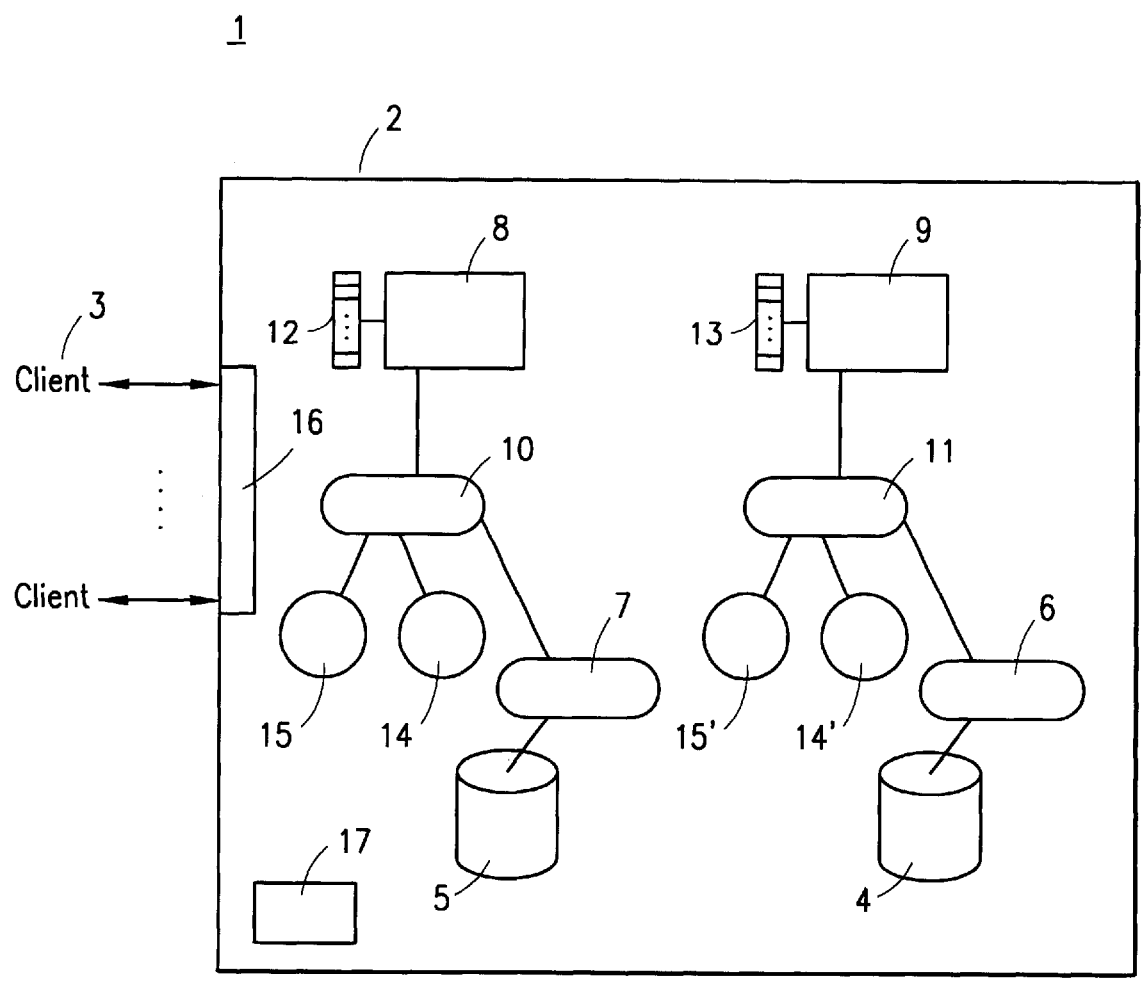
FIG. 1 is a block diagram of the processing system according to the present invention.

Referring to FIG. 1, there is shown a distributed transactional processing database system 1 according to the present invention. The system preferably includes distributed database 2 which provides data to a number of clients 3. Distributed database 2 preferably includes disk memory 4 and 5 which serve as the primary memory disk and the secondary memory disk for the distributed processing system 1, respectively. It is understood that the distributed processing system 1 possesses the capability to designate either disk memory 4 or disk memory 5 as the primary memory disk and the secondary memory disk during system operation. Disk memory 4 will be designated the primary memory disk and secondary memory disk memory 5 will be designated the secondary memory disk for exemplary purposes only. Primary disk memory 4 and secondary disk memory 5 are preferably operatively associated with disk manager processes 6 and 7, respectively. Disk manager 6 preferably serves as a primary disk manager for controlling access to primary disk memory 4. Similarly, disk manager 7 preferably serves as a secondary disk manager 7 for secondary disk memory 5 for controlling access thereto.

Distributed database 2 preferably further includes primary cache memory 8 and secondary cache memory 9, each of which is operatively connected to primary disk memory 4 and secondary disk memory 5 in order to serve as memory having a relatively fast access time for storing the most immediately accessed data. Distributed database 2 preferably further includes client processes 10 and 11 which are operatively associated with primary cache memory 8 and secondary cache memory 9, respectively. Client process 10 preferably acts as the cache manager for primary cache memory 8 by controlling access thereto. Similarly, client process 11 preferably acts as cache manager for secondary cache memory 9 by controlling access thereto. In this way, data is transferred between caches 8 and 9 and disk memories 4 and 5 via cache managers 10 and 11 and disk managers 6 and 7, as indicated in FIG. 1. By including dual caches 8 and 9 and dual disk memories 4 and 5, the present distributed transactional processing system 1 substantially ensures data availability to clients 3.

primary cache memory 8 and secondary cache memory 9 are preferably capable of maintaining multiple versions of a data object stored therein. Specifically, caches 8 and 9 preferably include or are otherwise operatively connected to index registers 12 and 13, respectively. Index registers 12 and 13 are preferably capable of pointing to different versions of the same data object stored in caches 8 and 9, respectively, and thus facilitate concurrent access thereto by more than one client 3. Index registers 12 and 13 are modified to point to a new version of a data object when the data object is written into caches 8 and 9, respectively, and when the data object is removed therefrom. When a data object is removed from caches 8 and 9, index registers 12 and 13 are modified to remove their reference to the version of the data object that is to be removed. The reference count for a data object helps to ensure that the data object continues to reside in the cache memory 8 or 9. A data object is considered wired in a cache memory 8 or 9 if the reference count therefor is one or more.

Distributed database 2 further includes processes 14–15 and 14'–15' which are controlled by clients 3 and which serve as client read and write processes for performing memory accesses within database 2. The transfer of data between the memory devices within database 2 and clients 3 is controlled by control and interface process 16.

As stated above, the present invention enables processing system 1 and/or database 2 to successfully commit a transaction, such as a request for writing or updating a data object in database 2, despite a failure occurring in one or more memory devices (caches 8 and 9 and disk memories 4 and 5). Specifically, the present system executes a data replication procedure which allows database 2 to continue to function despite the occurrence of memory device failure(s).

Figure 2A:
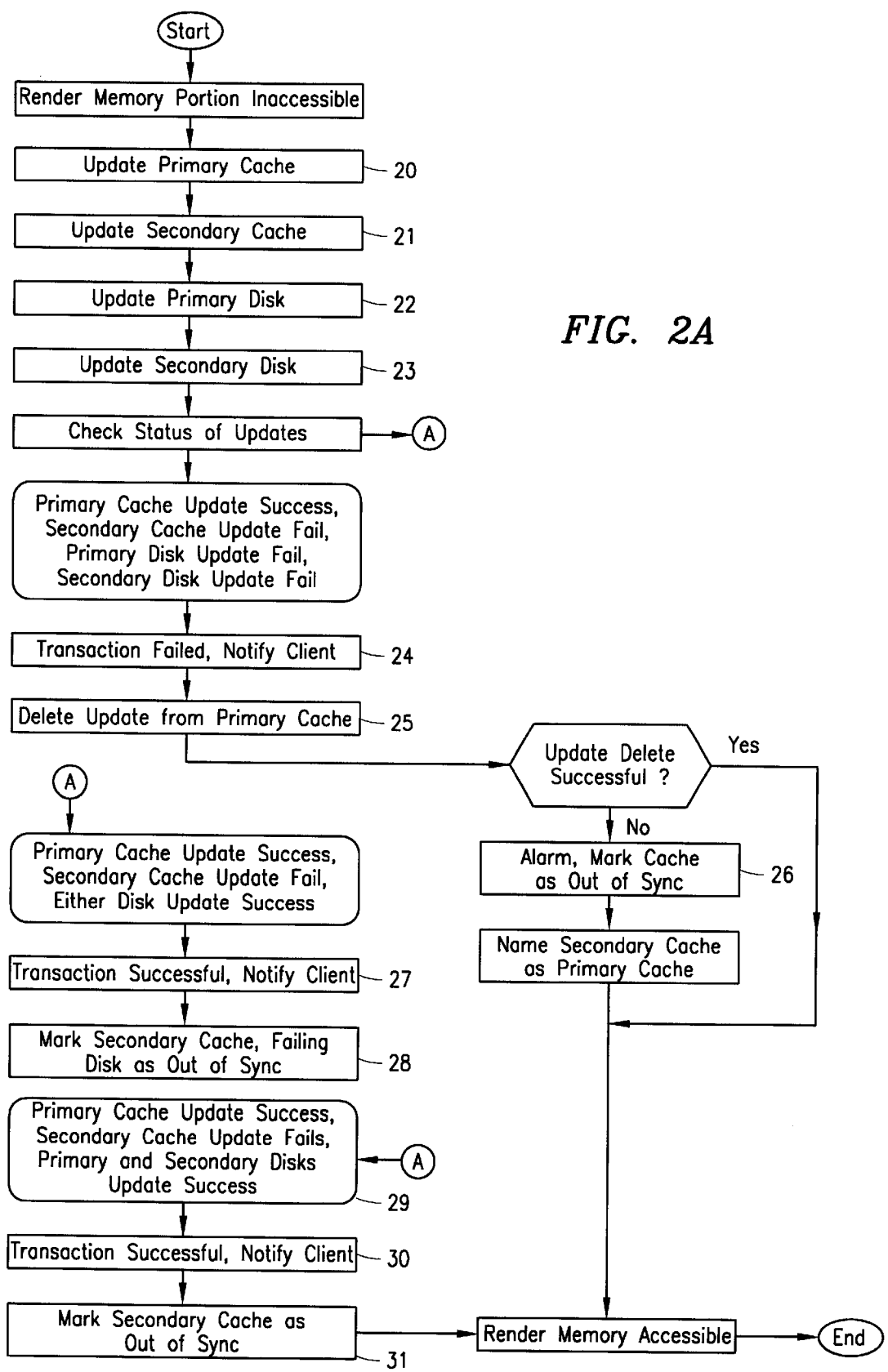
FIG. 2 is a flow chart illustrating the operation of the present invention.
Figure 2B:
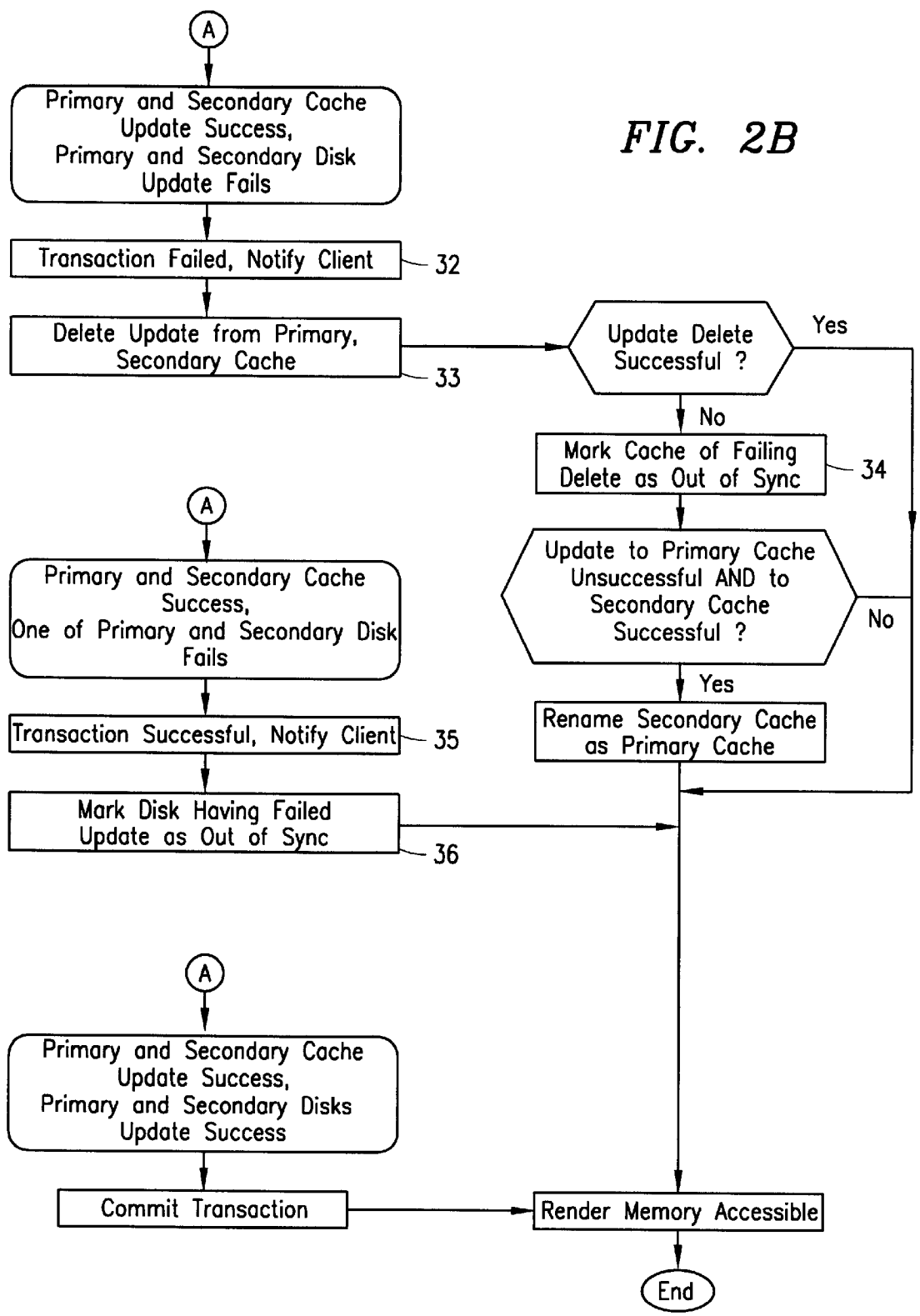

Referring to FIG. 2, the operation of the transactional processing system 1 is as follows. When database 2 receives an external transaction from a client 3, such as a request to commit to a memory update, interface and control process 16 manages the memory update. Because all four of the memory devices must be updated with the new data object (or version thereof) in order to maintain consistency therebetween, interface and control process 16 initiates a data replication procedure within database 2. Initially, a portion of database 2 is rendered inaccessible throughout the data replication process. The database portion rendered inaccessible may be the page in the memory devices containing the new data object (after being written therein) or even just the new data object itself. Next, an attempt is made to update primary cache memory 8 at step 20, followed by an attempt to update secondary cache memory 9 at step 21. Next, database 2 attempts to update primary disk memory 4 (step 22) and then attempts to update secondary disk memory 5 (step 23). The status of each of the four attempts to update the memory devices is maintained by interface and control process 16. It is noted that the specific sequence of memory updates is important in order to ensure consistency during the data replication procedure. For instance, initially updating caches 8 and 9 ensures that the new data object is accessible to system 1 during the time disk memories 4 and 5 are being updated.

Following the completion of the four attempts to update caches 8 and 9 and disk memories 4 and 5, interface and control process 16 preferably examines the status of each attempt, and determines whether to commit to the external transaction (the memory update request) based upon this examination.

In the event primary cache memory 8 was successfully updated while secondary cache memory 9, primary disk memory 4 and secondary disk memory 5 were not successfully updated, then interface and control process 16 determines that the external transaction (the memory update request) has failed at step 24. Interface and control process 16 then submits a response signal to the requesting client 3 that the commit to the request failed.

In addition, an attempt is made to delete the data object from primary cache memory 8 at step 25 in order to maintain consistency between the memory devices. This delete operation is carried out by modifying index register 12 associated with primary cache memory 8 so that index register 12 no longer points to the new data object. If the delete operation was unsuccessful, interface and control process 16 generates an alarm signal and marks primary cache memory 8 as being out of sync at step 26. At this point, the cache memory identified as secondary cache memory 9 is designated as the primary cache memory for the system.

Concerning primary cache memory 8 being identified as out of sync, the present system 1 may preferably allow for an automatic re-sync operation of primary cache memory 8 at a later time. For example, database 2 may maintain a log 17 which may contain a listing of the data objects which were not successfully updated in primary cache memory 8, secondary cache memory 9, primary disk memory 4 and secondary disk memory 5. Occasionally, such as on a periodic basis, an attempt is preferably undertaken to replicate the data objects which were previously unsuccessfully updated in the memory devices. In the event a memory device, such as primary cache memory 8, is successfully updated with those data objects which were previously unsuccessfully updated therein, the memory device is re-synced and fully operational.

In the event that only primary cache memory 8 and just one of disks 4 and 5 were successfully updated with the data object, then interface and control process 16 determines that the external transaction was successfully completed at step 27. Interface and control process 16 then submits a response to the requesting client 3 that the commit was successful. Secondary cache memory 9 and the disk memory 4 or 5 which also failed to be updated are marked as being out of sync at step 28.

In the event that only secondary cache memory 9 was unsuccessfully updated (step 29), then interface and control process 16 determines that the transaction was successfully completed (step 30). The requesting client 3 is sent a signal acknowledging the successful commit. Further, an alarm is generated as to secondary cache memory 9 failing to be updated, and secondary cache memory 9 is marked as being out of sync (step 31).

In the event the both primary disk memory 4 and secondary disk memory 5 were unsuccessfully updated while both caches 8 and 9 were successfully updated, then interface and control process 16 determines that the external transaction has failed (step 32). The requesting client 3 is notified of the unsuccessful commit (step 33). Next, an attempt is made to delete the new data object from both primary cache memory 8 and secondary cache memory 9 (step 33). If the new data object is unsuccessfully deleted from either or both of caches 8 or 9, then the cache(s) corresponding to a failed delete operation is marked as being out of sync (step 34).

In the event that only one of disks 4 or 5 was unsuccessfully updated with the data object while the remaining memory devices were successfully updated, interface and control process 16 determines that the external transaction was successfully executed (step 35). The client is notified of the occurrence of the successful commit. The disk memory 4 or 5 which was unsuccessfully updated is marked as being out of sync (step 36).

In the event that each memory device (primary cache memory 8, secondary cache memory 9, primary disk memory 4 and secondary disk memory 5) was successfully updated, then interface and control process 16 determines that the update was successful and submits a signal to that effect to the requesting client 3 (step 35).

It is noted that all other success scenarios not described above result in the external transaction being unsuccessfully executed.

The above-described procedure for data replication in a transactional processing system having high availability is based in part upon cache index registers, 12 and 13 being updated to point to the new data object (or version thereof) substantially concurrently with the updating of caches 8 and 9, respectively. It is understood that index registers 12 and 13 may alternatively be updated after successfully writing each memory device and only after a determination is made that the requested external transaction has successfully completed. In this way, clients are prevented from accessing the new data object version that may later be deleted due to the commit to the external transaction failing. In this alternative method, the index registers 12 and 13 will not have to be corrected if the external transaction fails. In fact, the only step necessary following the determination of the external transaction commit failure is releasing the space occupied by the new data object in caches 8 and 9.

Although the preferred embodiments of the system and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A method for replicating data in a database of a processing system, the database including a primary cache memory, a secondary cache memory, a primary disk memory and a secondary disk memory, the method comprising the steps of:

receiving a request from a client to write a data object in the database;

attempting to write the data object in the primary cache memory in response to the step of receiving the request;

attempting to write the data object in the secondary cache memory following the step of attempting to write in the primary cache memory;

attempting to write the data object in the primary disk memory following the step of attempting to write in the secondary cache memory;

attempting to write the data object in the secondary disk memory following the step of attempting to write in the primary disk memory;

checking for a successful writing of the data object in each of the primary cache memory, the secondary cache memory, the primary disk memory and the secondary disk memory;

acknowledging to the client of the successful writing of the data object upon an affirmative determination of the data object being successfully written in one of the primary cache memory and the secondary cache memory, and in one of the primary disk memory and the secondary disk memory; and attempting to delete the data object from at least one of the primary cache memory and the secondary cache memory upon the determination of the data being unsuccessfully written to the primary disk memory and the secondary disk memory; and following the step of attempting to delete, marking the at least one of the primary cache memory and the secondary cache memory as being out of sync upon a determination that the data object was unsuccessfully deleted therefrom.

2. The method of claim 1, further including the step of:

marking the secondary cache, the primary disk memory or the secondary disk memory as being out of sync based upon the step of checking.

3. The method of claim 2, wherein:

the step of marking comprises the step of marking the secondary cache as being out of sync upon a determination that the data object was not successfully written therein.

4. The method of claim 2, wherein:
the step of marking comprises the step of marking the primary disk memory as being out of sync upon a determination that the data object was not successfully written therein.

5. The method of claim 2, wherein:
the step of marking comprises the step of marking the secondary disk memory as being out of sync upon a determination that the data object was not successfully written therein.

6. The method of claim 1, further including the step of:
designating the secondary cache memory as the primary cache memory.

7. The method of claim 1, wherein:
the step of acknowledging is performed based upon the determination that the data object was successfully written to only one of the primary disk memory and the secondary disk memory.

8. A database for a transactional processing system, comprising:
a primary cache memory;
a secondary cache memory;
a primary memory disk;
a secondary memory disk;
one or more processes, operatively associated with the primary and secondary cache memories and the primary and secondary memory disks, for receiving a request from a client to write a data object in the database,
attempting to write the data object in the primary cache memory in response to receiving the request,
attempting to write the data object in the secondary cache memory following the attempting to write in the primary cache memory,
attempting to write the data object in the primary disk memory following the attempting to write in the secondary cache memory,
attempting to write the data object in the secondary disk memory following the attempting to write in the primary disk memory,
checking for a successful writing of the data object in each of the primary cache memory, the secondary cache memory, the primary disk memory and the secondary disk memory, and,
acknowledging to the client of the successful writing of the data object upon an affirmative determination of the data object being successfully written in one of the primary cache memory and secondary cache memory, and in one of the primary disk memory and the secondary disk memory,
attempting to delete the data object from at least one of the primary cache memory and the secondary cache memory upon the determination of the data object being unsuccessfully written to the primary disk memory and the secondary disk memory, and
following the attempting to delete, marking the at least one of the primary cache memory and the secondary cache memory as being out of sync upon a determination that the data object was unsuccessfully deleted therefrom.

9. The system of claim 8, wherein the one or more processes operate to:
mark the secondary cache, the primary disk memory or the secondary disk memory as being out of sync based upon the checking of successful writing by the means for checking.

10. The system of claim 9, wherein:
the one or more processes marks the secondary cache memory as being out of sync upon a determination that the data object was not successfully written therein.

11. The system of claim 9, wherein:
the one or more processes marks the primary disk memory as being out of sync upon a determination that the data object was not successfully written therein.

12. The system of claim 11, wherein the one or more processes operates to:
designate the secondary disk memory as the primary disk memory upon a determination that the data object was not successfully written into the primary disk memory.

13. The system of claim 9, wherein:
the one or more processes marks the secondary disk memory as being out of sync upon a determination that the data object was not successfully written therein.

14. The system of claim 8, wherein:
the one or more processes alerts the client of a failed attempt to write the data object upon an affirmative determination of the data object being unsuccessfully written to the primary disk memory and the secondary disk memory.

15. The method of claim 8, wherein:
the acknowledging is performed based upon the determination that the data object was successfully written to only one of the primary disk memory and the secondary disk memory.

16. A computer program product for a database of a transactional processing system having a plurality of caches and a plurality of disk memories, the computer program product including instructions for:
receiving a memory update request from a client;
sequentially attempting to update the caches;
sequentially attempting to update the disk memories;
examining the attempts to update the caches and the disk memories, and determining a result of the memory update request based upon the examining;
notifying the requesting client of the determination result;
attempting to delete the data object from at least one of the primary cache memory and the secondary cache memory upon the determination of the data object being unsuccessfully written to the primary disk memory and the secondary disk memory; and
following the attempting to delete, marking the at least one of the primary cache memory and the secondary cache memory as being out of sync upon a determination that the data object was unsuccessfully deleted therefrom.

17. The computer program product of claim 16, further including instructions for:
marking the caches and disk memories which were unsuccessfully updated as being out of sync.

18. The computer program product of claim 16, further including instructions for:
determining that the result is a failed memory update based upon the determination that the first cache which underwent the update attempt was not successfully updated.

19. A method for replicating data in a database, the database including a plurality of caches and a plurality of disk memories, the method comprising the steps of:
receiving a memory update request from a client;
sequentially attempting to update the caches;

sequentially attempting to update the disk memories following the step of sequentially attempting to update the caches;

examining the attempts to update the caches and the disk memories, and determining an unsuccessful memory update based upon the examining; and notifying the requesting client of the determination attempting to delete the data from at least one of the primary cache memory and the secondary cache memory upon the determination of the data object being unsuccessfully written to the primary disk memory and the secondary disk memory; and following the step of attempting to delete, marking the at least one of the primary cache memory and the secondary cache memory as being out of sync upon a determination that the data object was unsuccessfully deleted therefrom.

20. The method of claim 19, further including the step of:

marking the caches and disk memories which were unsuccessfully updated as being out of sync.

\* \* \* \* \*